(12) United States Patent
Kollar et al.

(10) Patent No.: US 9,967,763 B2
(45) Date of Patent: May 8, 2018

(54) EVALUATION OF THROUGHPUT OF AGGREGATED CONNECTIONS

(71) Applicant: Nokia Solutions and Networks Oy, Espoo (FI)

(72) Inventors: Martin Kollar, Kosice (SK); Yi Zhi Yao, Beijing (CN); Malgorzata Tomala, Wroclaw (PL)

(73) Assignee: Nokia Solutions and Networks Oy, Espoo (FI)

( * ) Notice: Subject to any disclaimer, the term of this patent is extended or adjusted under 35 U.S.C. 154(b) by 197 days.

(21) Appl. No.: 14/773,468

(22) PCT Filed: Mar. 8, 2013

(86) PCT No.: PCT/EP2013/054704
§ 371 (c)(1),
(2) Date: Sep. 8, 2015

(87) PCT Pub. No.: WO2014/135216
PCT Pub. Date: Sep. 12, 2014

(65) Prior Publication Data
US 2016/0029233 A1    Jan. 28, 2016

(51) Int. Cl.
*H04W 24/08* (2009.01)
*H04L 12/26* (2006.01)
(Continued)

(52) U.S. Cl.
CPC ......... *H04W 24/08* (2013.01); *H04L 43/0888* (2013.01); *H04L 5/001* (2013.01);
(Continued)

(58) Field of Classification Search
None
See application file for complete search history.

(56) References Cited

U.S. PATENT DOCUMENTS

| | | | |
|---|---|---|---|
| 2013/0010716 A1* | 1/2013 | Dinan | H04W 76/025 370/329 |
| 2016/0007232 A1* | 1/2016 | Wang | H04B 7/0456 370/280 |

OTHER PUBLICATIONS

3GPP TS 32.425 V12.0.0 (Jun. 2013), "3$^{rd}$ Generation Partnership Project; Technical Specification Group Services and System Aspects; Telecommunication management; Performance Management (PM); Performance measurements Evolved Universal Terrestrial Radio Access Network (E-UTRAN) (Release 12)", 74 pgs.

(Continued)

*Primary Examiner* — Mohammad S Adhami
(74) *Attorney, Agent, or Firm* — Harrington & Smith

(57) ABSTRACT

There are provided measures for evaluation of throughput of carrier aggregated user equipments. Such measures exemplarily include determining, per communication endpoint implementing carrier aggregation aggregating one primary connection and at least one secondary connection, a transmission volume with at least one activated secondary connection, determining, per communication endpoint implementing carrier aggregation aggregating one primary connection and at least one secondary connection, a time with transmission data in a transmission buffer and at least one activated secondary connection, and obtaining, per communication endpoint, a transmission throughput with at least one activated secondary connection, based on said transmission volume and said time.

19 Claims, 10 Drawing Sheets

(51) Int. Cl.
  *H04W 88/08* (2009.01)
  *H04L 5/00* (2006.01)
(52) U.S. Cl.
  CPC .......... *H04L 5/0098* (2013.01); *H04W 76/15* (2018.02); *H04W 88/08* (2013.01)

(56) References Cited

OTHER PUBLICATIONS

3GPP TS 36.314 V11.1.0 (Dec. 2012), "3$^{rd}$ Generation Partnership Project; Technical Specification Group Radio Access Network; Evolved Universal Terrestrial Radio Access (E-UTRA); Layer 2—Measurements (Release 11)", 20 pgs.
3GPP TS 36.314 V12.0.0 (Sep. 2014), "3$^{rd}$ Generation Partnership Project; Technical Specification Group Radio Access Network; Evolved Universal Terrestrial Radio Access (E-UTRA); Layer 2—Measurements (Release 12)", 20 pgs.
ETSI TS 132 425 V11.4.0 (Jan. 2013), LTE; Telecommunication management; Performance Management (PM); Performance measurements Evolved Universal Terrestrial Radio Access Network (E-UTRAN) (3GPP TS 32.425 version 11.4.0 Release 11), 73 pgs.
3GPP TSG-RAN WG2 Meeting #78, Prague, Czech Republic, May 21-25, 2012, R2-122157, "Summary of [77bis#21] Joint/MDT: Scheduled IP Throughput measurement scope", Nokia Siemens Networks, 12 pgs.

\* cited by examiner

EVALUATION OF THROUGHPUT OF AGGREGATED CONNECTIONS

FIELD

The present invention relates to evaluation of throughput of aggregated connections. More specifically, the present invention exemplarily relates to measures (including methods, apparatuses and computer program products) for realizing evaluation of throughput of aggregated connections.

BACKGROUND

The present specification generally relates to throughput determination procedures in network deployments. For example implementing carrier aggregation (CA) aggregating a primary cell and at least one secondary cell.

LTE-Advanced (LTE-A) aims to support peak data rates of 1 Gbps in the downlink and 500 Mbps in the uplink. In order to fulfill such requirements, a transmission bandwidth of up to 100 MHz is required. Since the availability of such large portions of contiguous spectrum is rare in practice, LTE-A utilizes carrier aggregation of multiple component carriers (CC) to achieve high bandwidth transmission. In doing so, LTE-A supports aggregation of up to five 20 MHz CCs.

All CCs in Long Term Evolution (LTE) Release 10 are designed to be backward-compatible. This means, that it is possible to configure each CC such that it is fully accessible to LTE Release 8 User Equipments (UE). From the higher-layer perspective, each CC appears as a separate cell with its own Cell identifier (ID). A UE that is configured for carrier aggregation connects to a Primary Serving Cell, which is known as PCell and up to four Secondary Serving Cells, which are known as SCell. The PCell is defined as the cell that is initially configured during connection establishment. The PCell plays a role with respect to security, non-access stratum (NAS) mobility information, system information (SI) for configured cells, and some lower layer functions.

After the initial security activation procedure, Evolved Universal Terrestrial Radio Access Network (E-UTRAN) may configure a UE, which supports carrier aggregation, with one or more SCells in addition to the PCell which is initially configured during connection establishment. The configured set of serving cells for a UE always contains one PCell and may also contain one or more SCells. The number of serving cells that can be configured may depend on the aggregation capability of a UE. A single Radio Resource Control (RRC) connection is established with the PCell, which may control all the CCs configured for a UE.

After RRC connection establishment to the PCell is performed, reconfiguration, addition and removal of SCells may be performed by RRC. In connected mode, changes of SI for a SCell are handled by release and addition of the affected SCell. Such release and addition may be done with a single RRC reconfiguration message.

In addition to discontinuous reception (DRX) operations, some kind of UE power saving may be achieved by fast activation and deactivation of individual SCells. Of course, the PCell may not be deactivated. When a SCell is deactivated, the UE may not have to receive data transmissions or monitor a physical downlink control channel (PDCCH) for that SCell, thus saving power. Activation and deactivation of SCells may be under evolved Node B (eNodeB, eNB) control. The activation and deactivation may be executed by means of medium access control (MAC) control elements, which can activate or deactivate one or more SCells indicated by an 8-bitmap. A timer may also be used for automatic deactivation if no data or PDCCH messages are received on a CC for a certain period.

The timing of activation and deactivation may be defined in order to ensure that there is a common understanding between the eNB and the UE. If a MAC control element activating a SCell is received in subframe n, then the SCell has to be ready for operation for example no later than in subframe n+8. If a MAC control element deactivating a SCell is received, or a deactivation timer expires, in subframe n, channel state information (CSI) report may cease from subframe n+8 on.

$3^{rd}$ Generation Partnership Project (3GPP) radio access network (RAN) and service and system aspects (SA) specifications widely standardize different aspects of CA functionality. An ongoing LTE Release 11 SA work item (WI) on management of CA for LTE reveals that CA influences performance measurements and there may be a need to extend existing methods.

Further, with respect to RAN measurement definitions for scheduled internet protocol (IP) throughput are developed in order to address various requirements on reflecting quality of service (QoS) in new and upcoming network deployments. The measurement is expected to be further examined, in particular under LTE Release 12 WI on further enhancements for minimization of drive tests (MDT). The WI objective aims at QoS related enhancements, and is treated also in context of CA.

Discussions of 3GPP under LTE Release 11 SA5 WI management of CA for LTE, which relates to how to monitor data rates that are visible both from cell and also end user point of view on packet data configuration protocol (PDCP) layer, are ongoing but no clear solution is available/agreed yet.

As mentioned above, from the perspective of a NAS, a UE is connected to a respective PCell. Other CCs are simply considered as additional transmission resources.

The multiple CCs of carrier aggregation may be not visible to PDCP and radio link control (RLC) layers. The respective protocols may therefore remain unchanged from LTE Release 8 except possible amendments to enable supporting data rate up to 1 Gbps.

One main benefit of CA feature as already mentioned is held to be supporting higher data rates. These, of course, shall be visible both from cell and also end user point of view on PDCP layer. The operator therefore should have reliable indicators/measurements to monitor and evaluate the same. Accordingly, evaluation of CA performance is an interested topic in 3GPP. However solutions therefore are missing by now.

FIG. 8 is an exemplary block diagram illustrating an overview of the user plane architecture in downlink direction. It is derivable from the overview given in FIG. 8 that multiple CCs of carrier aggregation are visible from MAC layer, namely, each CC may have its own independent hybrid automatic repeat request (HARQ) entity in MAC layer. However, as mentioned above, the multiple CCs of carrier aggregation may not be visible to the PDCP and RLC layers.

In general, PDCP service data unit (SDU) cell throughput and total IP scheduled (end user) throughput may be measured with techniques known from previous releases according to 3GPP. However, problems rise when IP scheduled (end user) throughput for CA UEs with part of data transmitted via SCell is to be evaluated. As the CA feature is intended to be applied only on restricted number of UEs, it is important to measure the IP scheduled throughput of those group of UEs only in order to be able to demonstrate the benefit of the feature. In this regard it is noted that providing a total end user throughput may deform and underestimate the benefits of the CA feature.

Main reasons for above mentioned problems are that the multiple CCs of carrier aggregation may be visible neither to the PDCP nor to RLC layer, and that one PDCP SDU frame related to CA UE with activated one or more SCells may be e.g. partly transmitted via PCell and one of the SCells, or via two SCells configured for the UE. In generic terms, neither from PDCP nor RLC layers view it can not be determined whether and how many SCells are involved in a considered transmission, such that it is not possible to form a CA related scheduled IP throughput conclusion.

In current LTE Release 11 RAN MDT WIs finer granularity in determination of scheduled IP throughput is introduced. However, since the reference points for measurement are not changed, the above mentioned problems are not overcome, i.e. e.g. the benefit of data transmitted over SCells is still not possible/visible to measure.

Hence, there is a need to provide for evaluation of throughput of carrier aggregated user equipments.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method, comprising determining, per communication endpoint implementing carrier aggregation aggregating one primary connection and at least one secondary connection, a transmission volume with at least one activated secondary connection, determining, per communication endpoint implementing carrier aggregation aggregating one primary connection and at least one secondary connection, a time with transmission data in a transmission buffer and at least one activated secondary connection, and obtaining, per communication endpoint, a transmission throughput with at least one activated secondary connection, based on said transmission volume and said time.

In the method, said transmission volume may be determined per each number of activated secondary connections within a range from one to a predefined maximum number, said time may be determined per said each number, and said transmission throughput may be obtained per said each number.

In the method, said transmission volume may be determined per radio access bearer, said time may be determined per radio access bearer, and said transmission throughput may be obtained per radio access bearer.

In relation to said obtaining, the method may further comprise dividing, per communication endpoint, said transmission volume by said time.

In the method, said transmission volume may be divided by said time per each number of activated secondary connections within a range from one to a predefined maximum number.

In the method, said transmission volume may be divided by said time per radio access bearer.

In relation to said determining said transmission volume, said method may further comprise increasing respective volume counters based on a size of successfully transmitted packet data configuration protocol serving data unit frames.

The method may further comprise delivering an inter-layer message indicating, per communication endpoint, activation or deactivation of a secondary connection, and deducing, per communication endpoint, an actual number of activated secondary connections based on said inter-layer message.

In the method, said actual number may be deduced per radio access bearer.

In relation to said determining said transmission volume, said method may further comprise modifying successfully transmitted medium access control service data unit frames by removing at least one of packet data configuration protocol headers, radio link control headers, medium access control headers, and hybrid automatic repeat request retransmissions, and increasing respective volume counters based on a size of said modified frames.

The method may further comprise delivering an inter-layer message including at least information regarding current sizes of packet data configuration protocol headers and/or radio link control headers necessary for modification of medium access control service data unit frames.

In relation to said determining said transmission volume, said method may further comprise increasing respective volume counters based on a size of successfully transmitted medium access control serving data unit frames.

The method may further comprise accumulating, for a predetermined evaluation period, each of said transmission volumes per communication endpoint, accumulating, for a predetermined evaluation period, each of said times per communication endpoint, and calculating, from said accumulated transmission volumes and said accumulated times, average and/or peak transmission throughput per communication endpoint.

In the method, said transmission volumes may be accumulated per each number of activated secondary connections within a range from one to a predefined maximum number, and said times may be accumulated per said each number.

In the method, said transmission volumes may be accumulated per radio access bearer, said times may be accumulated per radio access bearer, and said average and/or peak transmission throughput may be calculated per radio access bearer.

The method may be operable at or by a base station or access node of a cellular system.

The method may be operable in at least one of a LTE and a LTE-A cellular system.

In the method, said predefined maximum number may be four, and/or a connection may be a cell or established via a cell.

According to an exemplary aspect of the present invention, there is provided an apparatus, comprising determining means configured to determine, per communication endpoint implementing carrier aggregation aggregating one primary connection and at least one secondary connection, a transmission volume with at least one activated secondary connection, and to determine, per communication endpoint implementing carrier aggregation aggregating one primary connection and at least one secondary connection, a time with transmission data in a transmission buffer and at least one activated secondary connection, and obtaining means configured to obtain, per communication endpoint, a transmission throughput with at least one activated secondary connection, based on said transmission volume and said time.

In the apparatus, said transmission volume may be determined per each number of activated secondary connections within a range from one to a predefined maximum number, said time may be determined per said each number, and said transmission throughput may be obtained per said each number.

In the apparatus, said transmission volume may be determined per radio access bearer, said time may be determined per radio access bearer, and said transmission throughput may be obtained per radio access bearer.

The apparatus may further comprise dividing means configured to divide, per communication endpoint, said transmission volume by said time.

In the apparatus, said transmission volume may be divided by said time per each number of activated secondary connections within a range from one to a predefined maximum number.

In the apparatus, said transmission volume may be divided by said time per radio access bearer.

The apparatus may further comprise increasing means configured to increase respective volume counters based on a size of successfully transmitted packet data configuration protocol serving data unit frames.

The apparatus may further comprise delivering means configured to deliver an inter-layer message indicating, per communication endpoint, activation or deactivation of a secondary connection, and deducing means configured to deduce, per communication endpoint, an actual number of activated secondary connections based on said inter-layer message.

In the apparatus, said actual number may be deduced per radio access bearer.

The apparatus may further comprise modifying means configured to modify successfully transmitted medium access control service data unit frames by removing at least one of packet data configuration protocol headers, radio link control headers, medium access control headers, and hybrid automatic repeat request re-transmissions, and increasing means configured to increase respective volume counters based on a size of said modified frames.

The apparatus may further comprise delivering means configured to deliver an inter-layer message including at least information regarding current sizes of packet data configuration protocol headers and/or radio link control headers necessary for modification of medium access control service data unit frames.

The apparatus may further comprise increasing means configured to increase respective volume counters based on a size of successfully transmitted medium access control serving data unit frames.

The apparatus may further comprise accumulating means configured to accumulate, for a predetermined evaluation period, each of said transmission volumes per communication endpoint, and to accumulate, for a predetermined evaluation period, each of said times per communication endpoint, and calculating means configured to calculate, from said accumulated transmission volumes and said accumulated times, average and/or peak transmission throughput per communication endpoint.

In the apparatus, said transmission volumes may be accumulated per each number of activated secondary connections within a range from one to a predefined maximum number, and said times may be accumulated per said each number.

In the apparatus, said transmission volumes may be accumulated per radio access bearer, said times may be accumulated per radio access bearer, and said average and/or peak transmission throughput may be calculated per radio access bearer.

The apparatus may be operable as or at a base station or access node of a cellular system.

The apparatus may be operable in at least one of a LTE and a LTE-A cellular system.

In the apparatus, said predefined maximum number may be four, and/or a connection may be a cell or established via a cell.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects solve at least part of the problems and drawbacks identified in relation to the prior art.

By way of exemplary embodiments of the present invention, there is provided evaluation of throughput of carrier aggregated user equipments. More specifically, by way of exemplary embodiments of the present invention, there are provided measures and mechanisms for realizing evaluation of throughput of carrier aggregated user equipments. Thus, improvement is achieved by methods, apparatuses and computer program products enabling/realizing evaluation of throughput of carrier aggregated user equipments.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, LTE scenario implementing carrier aggregation aggregating a primary cell and at least one secondary cell is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) evaluation of throughput of carrier aggregated user equipments.

Throughput determination procedures in network deployments may allow connectivity of User Equipments (UEs) to a network consisting of or involving at least two parts or components. For example, the network deployment implementing carrier aggregation (CA) aggregating a primary cell and at least one secondary cell or dual connectivity in small cell deployments while UE is connected to macro and small cell in parallel.

Figure 1:
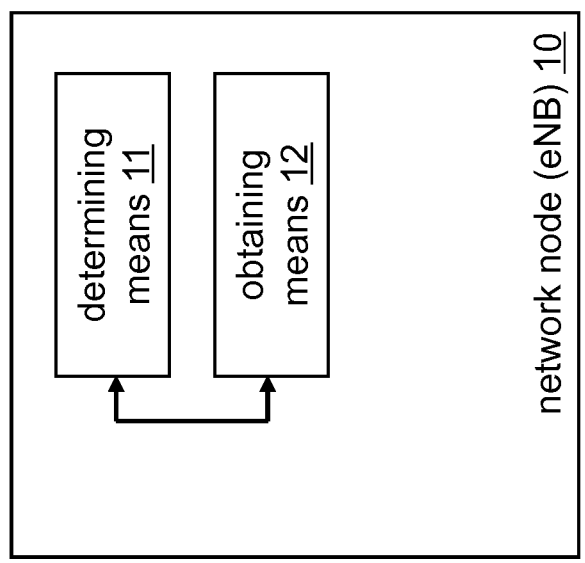
FIG. 1 is a block diagram illustrating an apparatus according to exemplary embodiments of the present invention.
Figure 3:
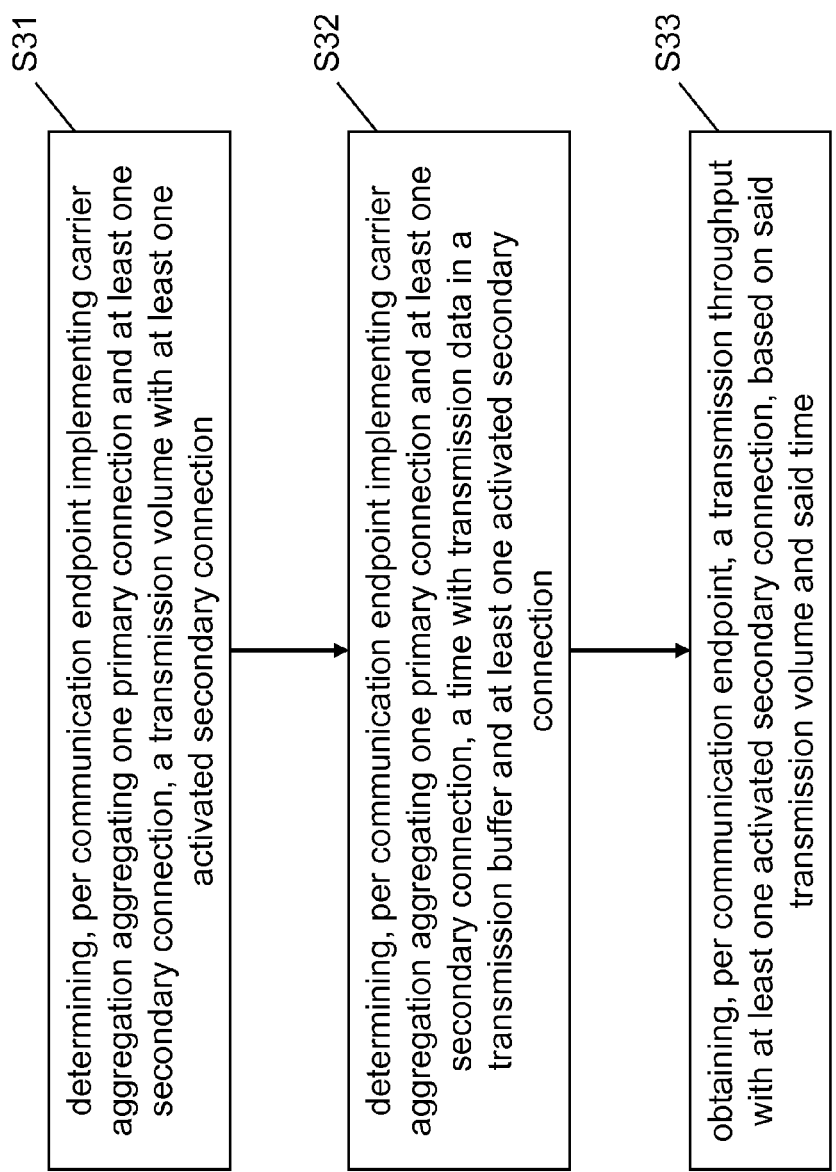
FIG. 3 is a schematic diagram of a procedure according to exemplary embodiments of the present invention.

FIG. 1 is a block diagram illustrating an apparatus according to exemplary embodiments of the present invention. The apparatus may be a network node such as an eNB. FIG. 3 is a schematic diagram of a procedure according to exemplary embodiments of the present invention. The apparatus according to FIG. 1 may perform the method of FIG. 3 but is not limited to this method. The method of FIG. 3 may be performed by the apparatus of FIG. 1 but is not limited to being performed by this apparatus.

As shown in FIG. 1, according to exemplary embodiments of the present invention, the apparatus is a network node 10 comprising a determining means 11 and an obtaining means 12. The determining means 11 determines, per communication endpoint implementing carrier aggregation aggregating a primary connection (e.g. a primary cell or a connection established by a primary cell) and at least one secondary connection (e.g. a secondary cell or a connection established by a secondary cell), a transmission volume with at least one activated secondary connection. The determining means 11 further determines, per communication endpoint implementing carrier aggregation aggregating a primary connection and at least one secondary connection, a time with transmission data in a transmission buffer and at least one activated secondary connection. The obtaining means 12 obtains, per communication endpoint, a transmission throughput with at least one activated secondary connection, based on said transmission volume and said time.

FIG. 3 is a schematic diagram of a procedure according to exemplary embodiments of the present invention.

As shown in FIG. 3, a procedure according to exemplary embodiments of the present invention comprises an operation of determining, per communication endpoint implementing carrier aggregation aggregating one primary connection and at least one secondary connection, a transmission volume with at least one activated secondary connection, an operation of determining, per communication endpoint implementing carrier aggregation aggregating one primary connection and at least one secondary connection, a time with transmission data in a transmission buffer and at least one activated secondary connection, and an operation of obtaining, per communication endpoint, a transmission throughput with at least one activated secondary connection, based on said transmission volume and said time.

According to exemplary embodiments of the present invention, the transmission volume may be determined per each number of activated secondary connections within a range from one to a predefined maximum number and/or per radio access bearer, the time may be determined per said each number and/or per radio access bearer, and the transmission throughput may be obtained per said each number and/or per radio access bearer.

That is, according to exemplary embodiments of the present invention, evaluation of throughput (e.g. IP or MAC) that CA UEs benefit from SCell(s) activation is enabled. The evaluation of throughput for CA UE with activated one, two, three or four SCells is done per UE and per evolved radio access bearer (E-RAB) with taking into account CC activation times. In this regard it is noted that some vendors support only non guaranteed bit rate (non-GBR) traffic transmitted via CA. For such implementations, it is possible to provide (IP scheduled) throughput for nonGBR traffic of CA UEs with activated one, two, three or four SCells per UE and per nonGBR E-RAB. It is further noted that according to exemplary embodiments of the present invention measuring the (IP scheduled) throughput is considered with per E-RAB granularity, as the CA UE with activated one or more SCells per E-RAB is the smallest element distinguishable for CA feature on PDCP layer.

Namely, frames transmitted with activated given number of SCells per a UE are counted. Further, active time of CA UE and of E-RAB with data in the buffer and in parallel activated one, two, three or four SCells, respectively, is counted. Based on those determined values, the transmission throughput achieved by SCell(s) activation is obtained.

According to exemplary embodiments of the present invention, three exemplary implementations are given which are not to be considered as a complete listing.

According to a first implementation, the PDCP SDU volume on PDCP layer and active time of CA UEs/E-RABs with data in the buffer and activated respective number of SCells are measured.

According to a second implementation, the PDCP SDU volume on MAC SDU level is measured with consequent removal of the PDCP and RLC headers and ARQ re-transmissions, and active time of CA UEs/E-RABs with data in the buffer and activated respective number of SCells is measured.

According to a third implementation the PDCP SDU volume is replaced with MAC SDU volume (i.e. the MAC SDU volume is measured), and active time of CA UEs/E-

RABs with data in the buffer and activated respective number of SCells is measured.

Figure 4:
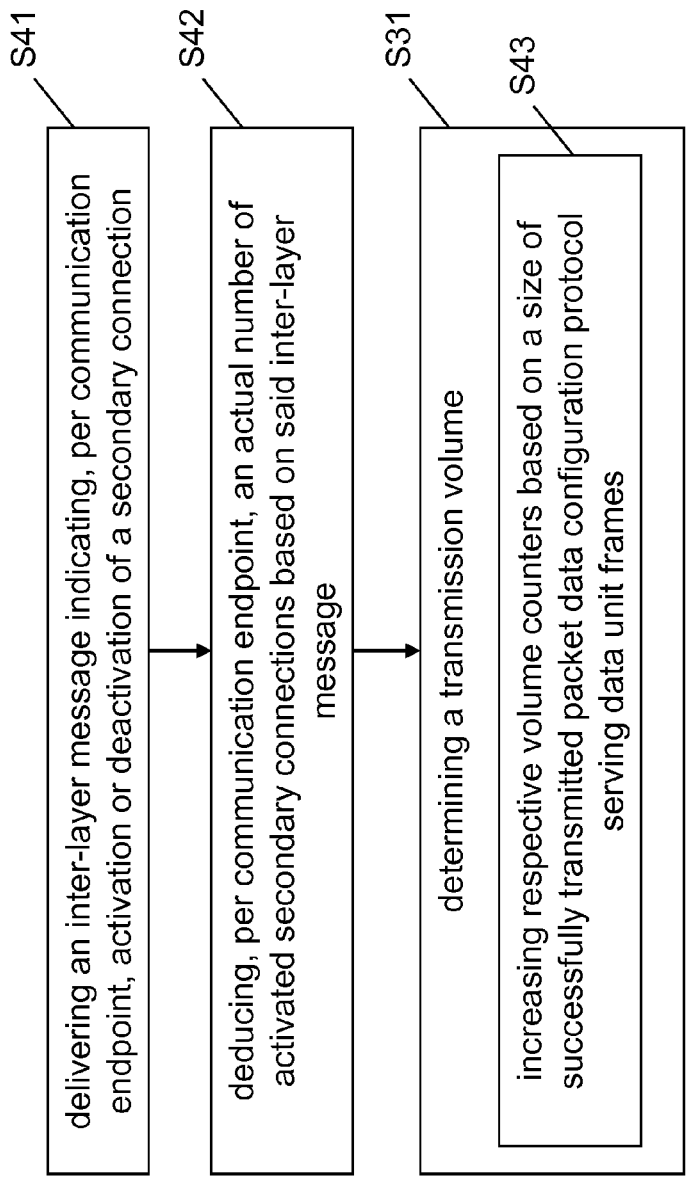
FIG. 4 is a schematic diagram of a procedure according to exemplary embodiments of the present invention.

FIG. 4 is a schematic diagram of a procedure according to exemplary embodiments of the present invention, in particular, illustrating a variation (i.e. the first exemplary implementation) of the procedure shown in FIG. 3. Namely, exemplary details of the determining operation (transmission volume) and exemplary additional operations are given, which are inherently independent from each other as such.

Such exemplary determining operation according to exemplary embodiments of the present invention may comprise an operation of increasing respective volume counters based on a size of successfully transmitted packet data configuration protocol serving data unit frames.

Further, according to a variation as illustrated in FIG. 4, an exemplary method according to exemplary embodiments of the present invention may additionally comprise an operation of delivering an inter-layer message indicating, per communication endpoint, activation or deactivation of a secondary cell, and an operation of deducing, per communication endpoint, and per radio access bearer, an actual number of activated secondary cells based on said inter-layer message.

In other words, according to exemplary embodiments of the present invention, the PDCP SDU volume is measured by counting the size of the PDCP SDU frames transmitted with activated given number of SCells per UE on PDCP layer. The respective number of SCells is informed on activation/deactivation of the given SCell by receiving an activation/deactivation internal message from MAC layer, whose sending is always delayed by 8 subframes from when MAC control activation/deactivation element is sent to UE. Further, the PDCP SDU volume obtained with that procedure is divided by active time of CA UE and of E-RAB with data in the buffer and in parallel activated one, two, three or four SCells, respectively.

Figure 9:
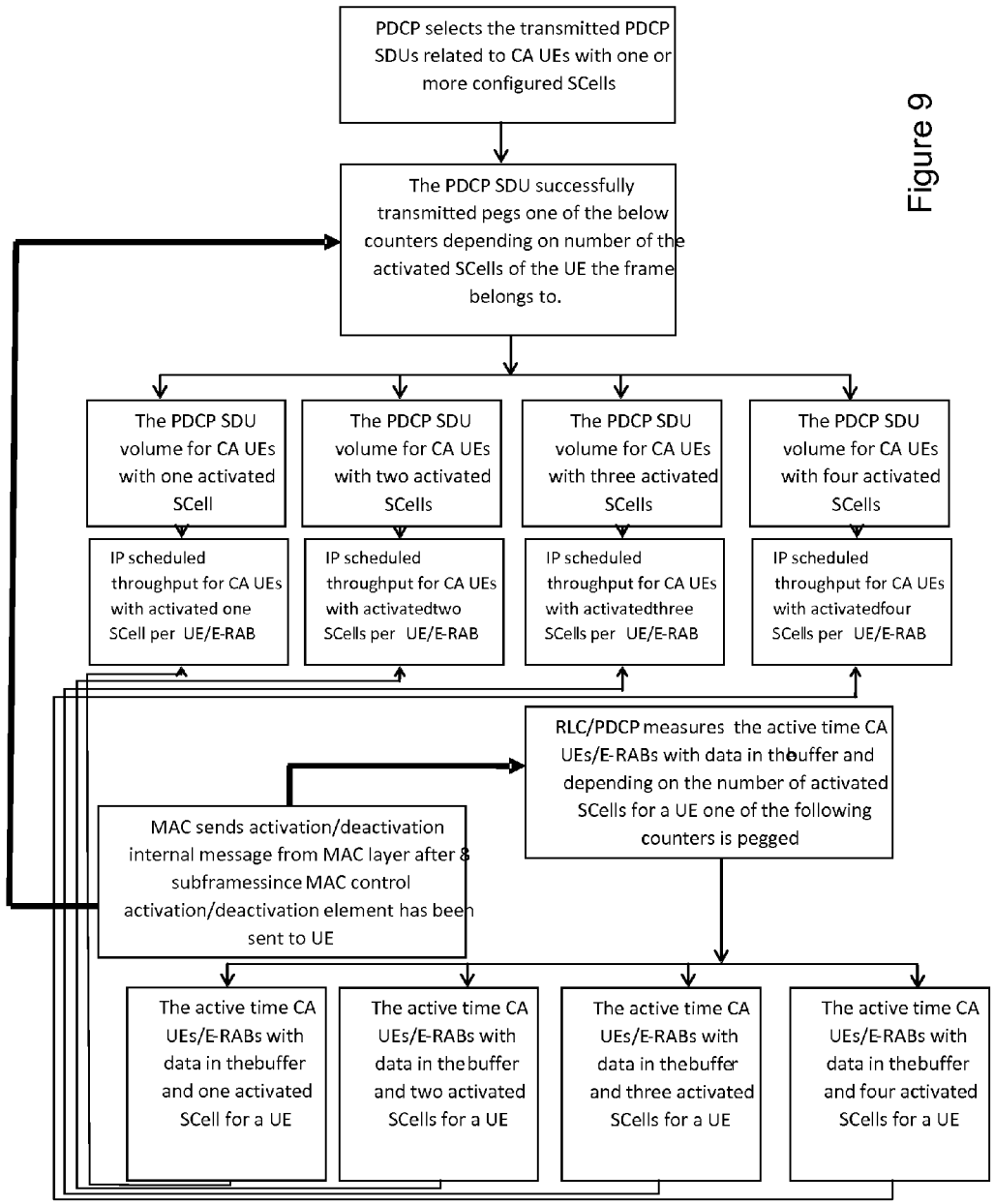
FIG. 9 is a schematic diagram illustrating a principle of exemplary embodiments of the present invention.

The thus presented first exemplary implementation is further described utilizing FIG. 9, illustrating a principle of exemplary embodiments of the present invention.

It should be noted that the processes related to PDCP, RLC and MAC layers according to this figure are considered to run simultaneously. It shall also note that the FIG. 9 focuses on the principle of the IP throughput measurement meaning that tasks are formulated only for PDCP, RLC and MAC layers, but does not reflect the frames transmission between the layers as this is remained unchanged according to exemplary embodiments of the present invention.

As is derivable from FIG. 9, in the PDCP layer a selection only on PDCP SDU frames belonging to CA UEs with at least one SCell configured is done in a first step. In a second step with PDCP SDU frames successfully transmitted, one of the four PDCP SDU volume counters (depending on the number of the SCells activated for the UE the evaluated PDCP SDU frame belongs to) is increased. Of course, in case there is no SCell activated for the respective UE, no counter is pegged, i.e. increased.

In parallel, and independent therefrom, the MAC layer sends an activation/deactivation internal message to PDCP layer on a per SCell basis. The sending of this message is delayed by 8 subframes from the time when MAC activation/deactivation control element is sent to a respective UE. It is noted that according to experiments the message is expected to be sent once per couple of seconds, i.e. with frequency tenths of Hz per SCell. The same internal message is also sent to RLC/PDCP layer. While in PDCP layer the internal message is used to determine the number of currently activated SCells for associating a PDCP SDU frame to a volume counter, in RLC/PDCP layer the internal message is used to measure active time of CA UEs/E-RABs with data in the buffer and in parallel activated given number of SCells.

At a final step, the IP scheduled throughput for CA UEs with activated one, two, three or four SCells per UE and per E-RAB is calculated from the mentioned partial results obtained in PDCP and/or RLC layers. It is noted that the method follows the principles mentioned in 3GPP 36.314 (chapter 4.1.6) in relation to excluding the pieces of data related to transmission time intervals (TTI) empting the buffer, as the services transmitted using CA feature shall have data bursts that are large enough to require transmissions to be split across multiple TTIs.

According to exemplary embodiments, in reasonable eNB implementations, delays (i.e. late deactivation/activation internal message from MAC layer) possibly causing the PDCP SDU frame being incorrectly evaluated as successfully transmitted/not transmitted for given number of activated SCell for the respective UE do not have any impact.

Further, if the CA feature is actually used for higher traffic services, it does not happen that there is some data to be transmitted for PCell and no data for (activated) SCell, i.e., it does not happen that although there is no data to be transmitted via SCell, the SCell is still activated (in such case, it is expected that there is no data in the buffer at all for the respective UE). Accordingly, a timer expiry theoretically needed to deactivate a SCell to prevent an error (which is compensated way automatically) caused by i.e. a real time period corresponding to the SCell activation time in case that there is some (SCell) data transmission shorter than a measurable time period is held to be obsolete in view of the above mentioned activation/deactivation of SCells based on a load.

It is noted that the first implementation is preferred as it enables to obtain IP scheduled throughput for CA UEs with activated one, two, three or four SCells per UE and per E-RAB.

Figure 5:
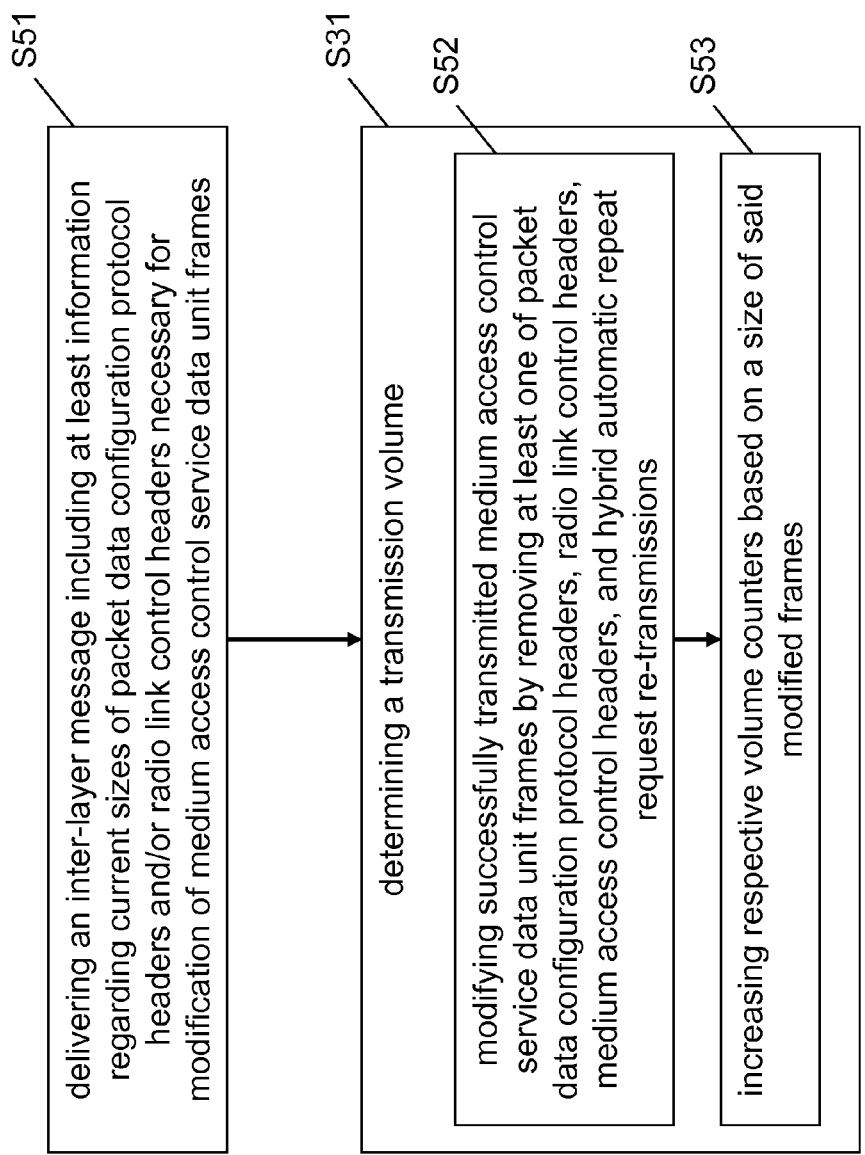
FIG. 5 is a schematic diagram of a procedure according to exemplary embodiments of the present invention.

FIG. 5 is a schematic diagram of a procedure according to exemplary embodiments of the present invention, in particular, illustrating a variation (i.e. the second exemplary implementation) of the procedure shown in FIG. 3. Namely, exemplary details of the determining operation (transmission volume) and exemplary additional operations are given, which are inherently independent from each other as such.

Such exemplary determining operation according to exemplary embodiments of the present invention may comprise an operation of modifying successfully transmitted medium access control service data unit frames by removing at least one of packet data configuration protocol headers, radio link control headers, medium access control headers, and hybrid automatic repeat request re-transmissions, and an operation of increasing respective volume counters based on a size of said modified frames.

Further, according to a variation as illustrated in FIG. 5, an exemplary method according to exemplary embodiments of the present invention may additionally comprise an operation of delivering an inter-layer message including at least information regarding current sizes of packet data configuration protocol headers and/or radio link control headers necessary for modification of medium access control service data unit frames.

In other words, in comparison to the first exemplary implementation, the PDCP SDU volume is obtained from MAC SDU volume with consequent removal of the PDCP, RLC and MAC headers and (H)ARQ re-transmissions. The advantage of this implementation is that no internal activation/deactivation SCell messages from MAC to PDCP are needed. However, due to variable header size on RLC and PDCP layer impeding the removal of the respective headers, other information in the form of internal messages must be communicated from RLC and PDCP layer to MAC which might make the implementation expensive. The active time of CA UEs/E-RABs with data in the buffer and activated respective number of SCells is measured. The IP scheduled throughput for CA UEs with activated one, two, three or four SCells per UE and per E-RAB is calculated from the partial results obtained in PDCP and/or RLC layers, i.e. in the same way as in the first implementation.

Figure 6:
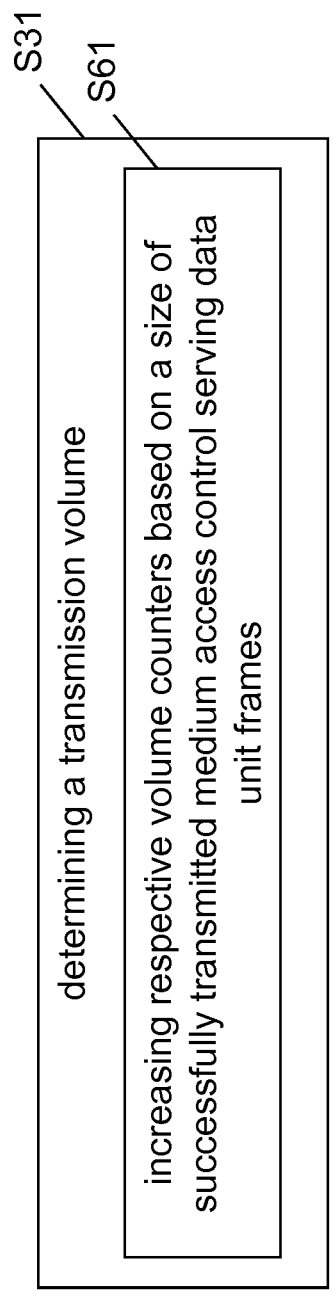
FIG. 6 is a schematic diagram of a procedure according to exemplary embodiments of the present invention.

FIG. 6 is a schematic diagram of a procedure according to exemplary embodiments of the present invention, in particular, illustrating a variation (i.e. the third exemplary implementation) of the procedure shown in FIG. 3. Namely, exemplary details of the determining operation (transmission volume) are given, which are inherently independent from each other as such.

Such exemplary determining operation according to exemplary embodiments of the present invention may comprise an operation of increasing respective volume counters based on a size of successfully transmitted medium access control serving data unit frames.

That is, as an alternative, evaluation/determination of the throughput is done by measurement of the MAC SDU volume by counting the size of the MAC SDU frames transmitted with activated given number of SCells per UE and dividing the MAC SDU volume obtained with that procedure by active time of CA UEs and of E-RAB with data in the buffer and in parallel activated one, two, three or four SCells, respectively.

In other words, In comparison to first exemplary implementation, the PDCP SDU volume is replaced with MAC SDU volume, (i.e. without consequent removal of the PDCP and RLC headers, and ARQ re-transmissions as proposed in the second exemplary implementation). The advantage of this implementation is that no internal activation/deactivation SCell messages from MAC to PDCP are needed. The active time of CA UEs/E-RABs with data in the buffer and activated respective number of SCells is measured. The IP scheduled throughput for CA UEs with activated one, two, three or four SCells per UE and per E-RAB is calculated from the partial results obtained in MAC and RLC layers. However, the calculated throughput is MAC SDU throughput for CA UEs with data in the buffer with respective number of activated SCells instead of IP scheduled (end user) throughput.

It is noted that although according to the third exemplary implementation MAC SDU throughput for CA UEs with data in the buffer with respective number of activated SCells is obtained, this implementation is e.g. very useful as the calculated throughput is exactly on the level where CCs are firstly visible and thus provides worth information from network point of view for the CA feature tuning. The QCI of the radio bearer that is carrying the MAC SDU may be known to MAC layer.

Figure 7:
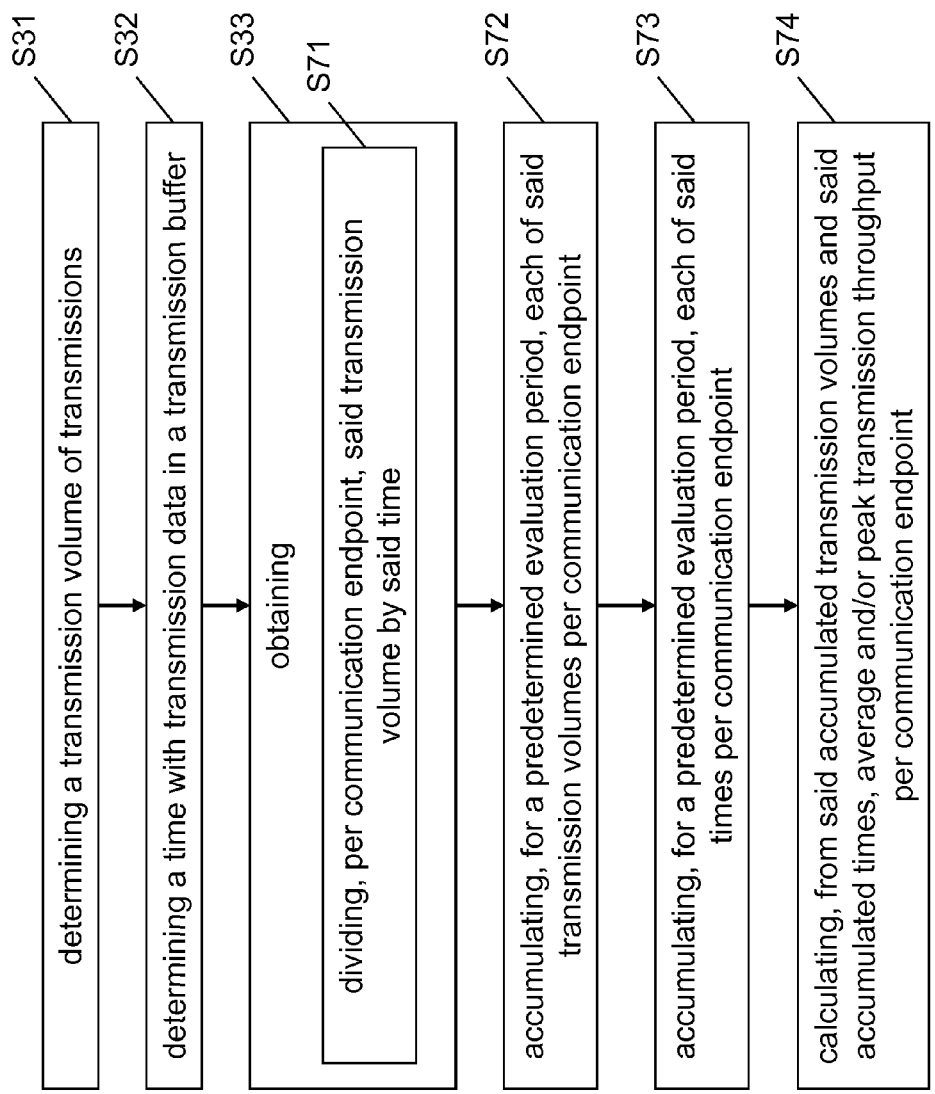
FIG. 7 is a schematic diagram of a procedure according to exemplary embodiments of the present invention.
Figure 8:
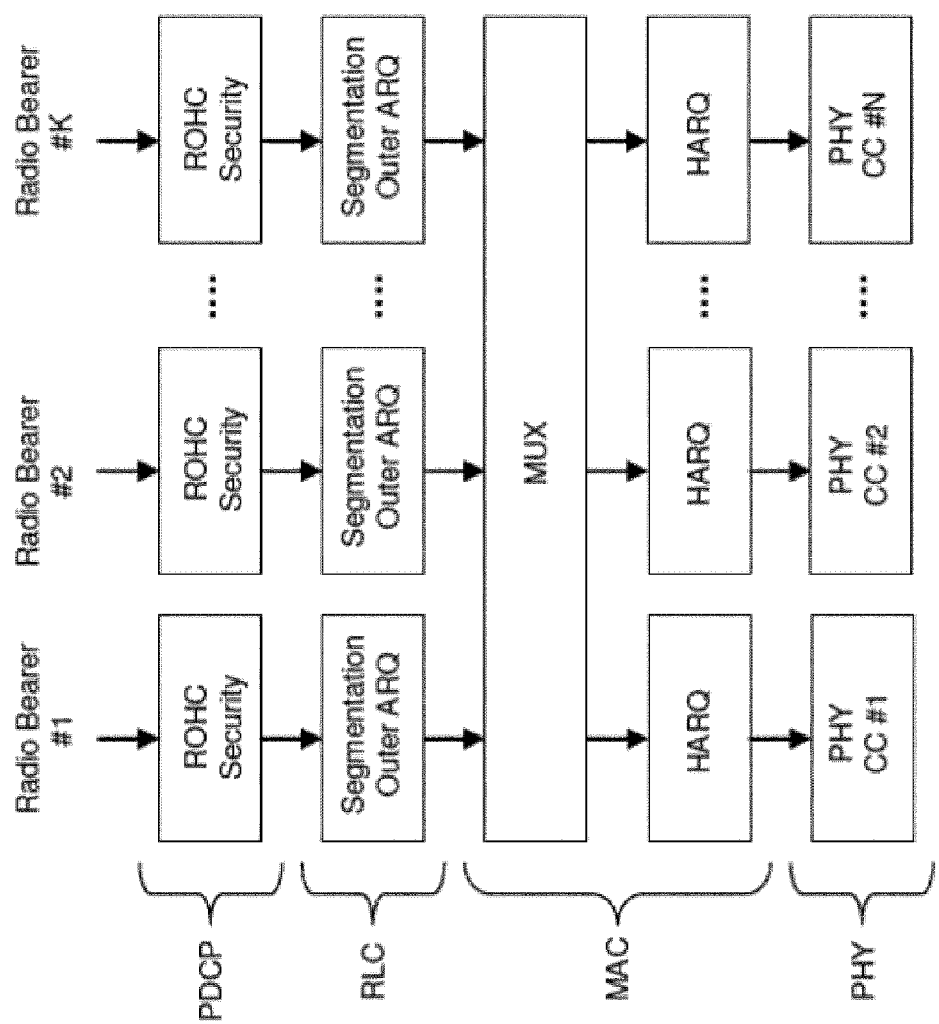
FIG. 8 is a block diagram illustrating an exemplary overview of the user plane architecture in downlink direction.

FIG. 7 is a schematic diagram of a procedure according to exemplary embodiments of the present invention, in particular, illustrating a variation of the procedure shown in FIG. 3. Namely, exemplary details of the obtaining operation and exemplary additional operations are given, which are inherently independent from each other as such.

Such exemplary obtaining operation according to exemplary embodiments of the present invention may comprise an operation of dividing, per communication endpoint, per said each number, and per radio access bearer, said transmission volume by said time.

Further, according to a variation as illustrated in FIG. 7, an exemplary method according to exemplary embodiments of the present invention may additionally comprise an operation of accumulating, for a predetermined evaluation period, each of said transmission volumes per communication endpoint, per said each number, and per radio access bearer, an operation of accumulating, for a predetermined evaluation period, each of said times per communication endpoint, per said each number, and per radio access bearer, and an operation of calculating, from said accumulated transmission volumes and said accumulated times, average and/or peak transmission throughput per communication endpoint, and per radio access bearer.

In other words, at eNB/operation and maintenance (OAM) side, statistics of the average and/or peak throughput of carrier aggregated UEs per UE/E-RAB (QoS class identifier (QCI)) are also useful to evaluate the overall performance in terms of the throughput in carrier aggregation. To get said average throughput per carrier aggregated UE/E-RAB in a certain performance measurements collecting period, said PDCP/MAC SDU volume (maybe split into per QCI) transmitted with activated given number of SCells is total volume from all carrier aggregated UEs (if split into per QCI, it is the total volume on the E-RABs with the same QCI from all CA UEs), and the active time of CA UEs (maybe split into per QCI) is the total active time of all CA UEs (if split into per QCI, it is the total active time on the E-RABs with the same QCI of all CA UEs).

Figure 2:
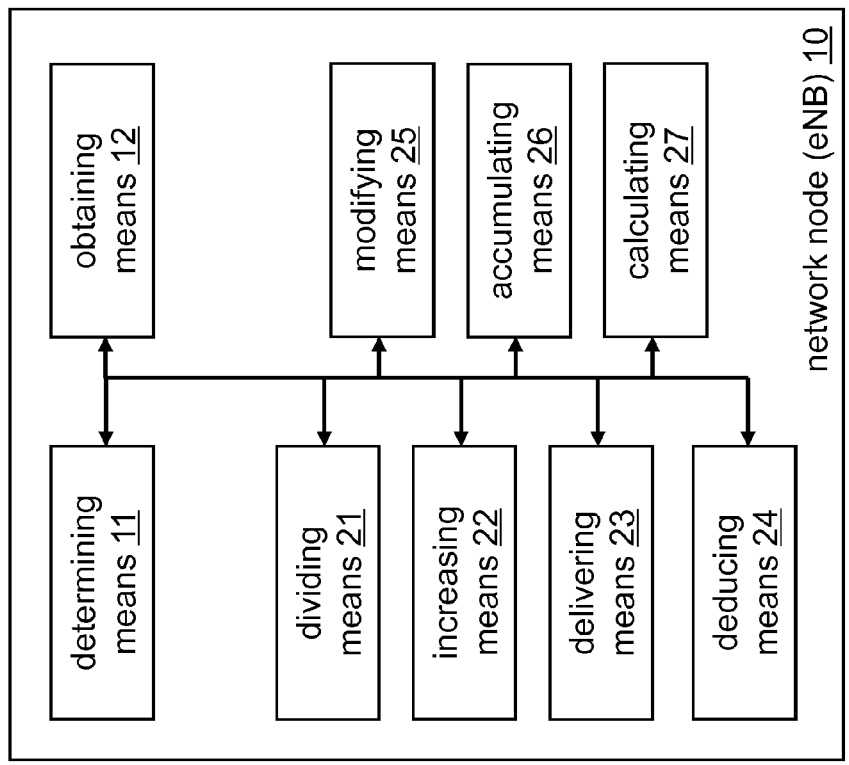
FIG. 2 is a block diagram illustrating an apparatus according to exemplary embodiments of the present invention.

FIG. 2 is a block diagram illustrating an apparatus according to exemplary embodiments of the present invention, in particular, illustrating a variation of the apparatus shown in FIG. 1.

The apparatus according to FIG. 2 comprises a determining means 11, an obtaining means 12, a dividing means 21, an increasing means 22, a delivering means 23, a deducing means 24, a modifying means 25, an accumulating means 26, and a calculating means 27.

The apparatus according to FIG. 2 may also comprise only part of the mentioned means and may perform the method of FIGS. 3 to 7, but is not limited to this method. The method of FIGS. 3 to 7 may be performed by the apparatus of FIG. 2 but is not limited to being performed by this apparatus.

According to further exemplary embodiments of the present invention, the above-described procedures and functions may potentially be applied for measurements in dual connectivity deployments. In particular, in relation to small cell deployments, and/or when the throughput served by the secondary carrier (SCell) is realized by a small cell.

According to still further exemplary embodiments of the present invention, the respective measured throughputs may be measured only classified as CA used and CA not used. Further instead of the number of active SCells, a total carrier bandwidth of (CA-configured), (activated) serving (secondary) cells may be utilized. As a further variation according to still further embodiments of the present invention, carrier bandwidth of each active serving cell could be added on top of the throughput derived by the above mentioned exemplary implementations.

The above-described procedures and functions are preferably implemented on the eNB side. However, according to still further embodiments of the present invention, the above-described procedures and functions are implemented at UE side and then reported to the eNB (e.g., via MDT or other means).

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 10:
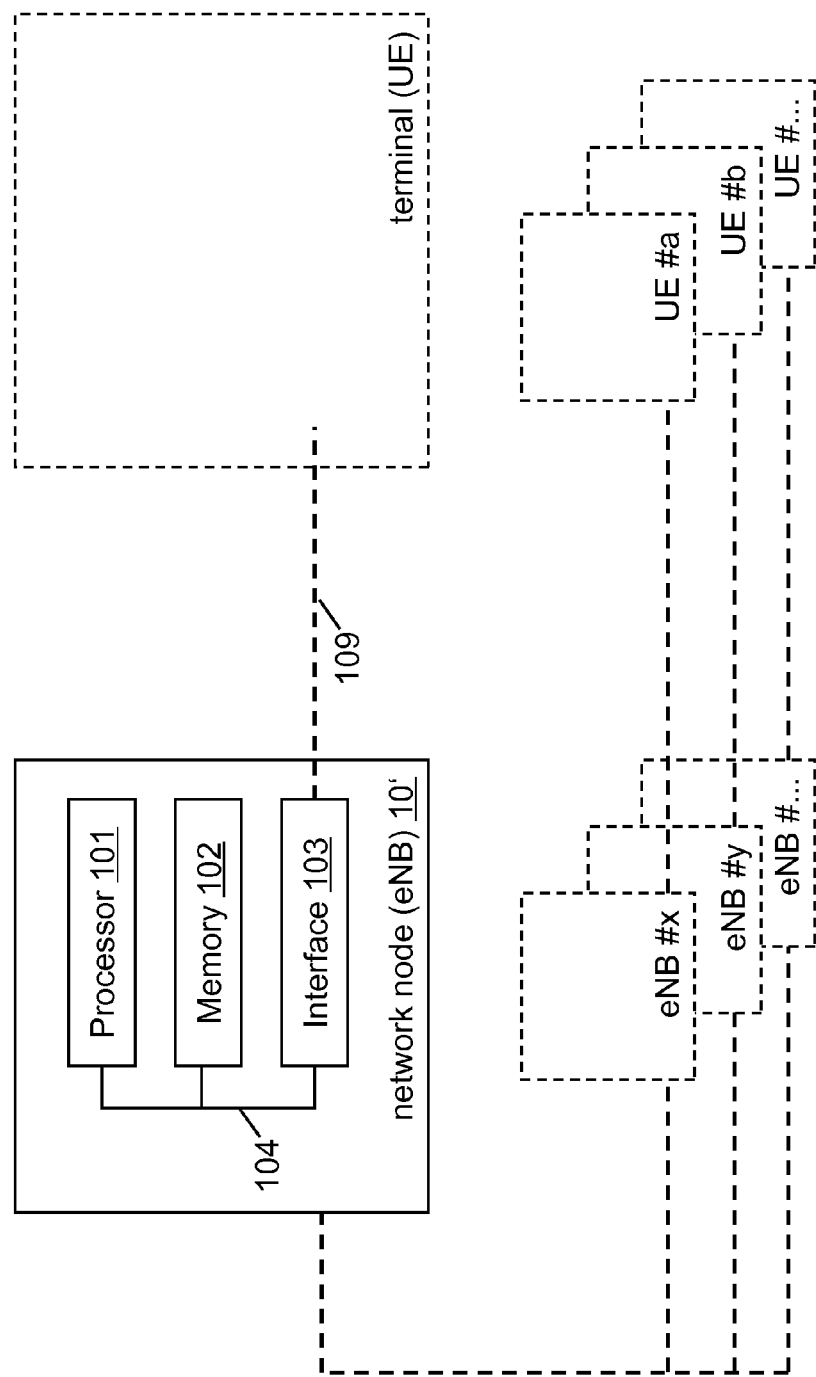
FIG. 10 is a block diagram alternatively illustrating apparatuses according to exemplary embodiments of the present invention.

In FIG. 10, an alternative illustration of apparatuses according to exemplary embodiments of the present invention is depicted. As indicated in FIG. 10, according to exemplary embodiments of the present invention, the apparatus (network node) 10' (corresponding to the network node 10) comprises a processor 101, a memory 102 and an interface 103, which are connected by a bus 104 or the like, and may be connected with e.g. a terminal via link 109.

The processor 101 and/or the interface 103 may also include a modem or the like to facilitate communication over a (hardwire or wireless) link, respectively. The interface 103 may include a suitable transceiver coupled to one or more antennas or communication means for (hardwire or wireless) communications with the linked or connected device(s), respectively. The interface 103 is generally configured to communicate with at least one other apparatus, i.e. the interface thereof.

The memory 102 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the network node 10 comprises at least one processor 101, at least one memory 102 including computer program code, and at least one interface 103 configured for communication with at least another apparatus. The processor (i.e. the at least one processor 101, with the at least one memory 102 and the computer program code) is configured to perform determining, per communication endpoint implementing carrier aggregation aggregating one primary connection and at least one secondary connection, a transmission volume with at least one activated secondary connection (thus the apparatus comprising corresponding means for determining), to perform determining, per communication endpoint implementing carrier aggregation aggregating one primary connection and at least one secondary connection, a time with transmission data in a transmission buffer and at least one activated secondary connection, and to perform obtaining, per communication endpoint, a transmission throughput with at least one activated secondary connection, based on said transmission volume and said time (thus the apparatus comprising corresponding means for obtaining).

For further details regarding the operability/functionality of the individual apparatuses, reference is made to the above description in connection with any one of FIGS. 1 to 9, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person. Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for evaluation of throughput of carrier aggregated user equipments. Such measures exemplarily comprise determining, per communication endpoint implementing carrier aggregation aggregating one primary connection and at least one secondary connection, a transmission volume with at least one activated secondary connection, determining, per communication endpoint implementing carrier aggregation aggregating one primary connection and at least one secondary connection, a time with transmission data in a transmission buffer and at least one activated secondary connection, and obtaining, per communication endpoint, a transmission throughput with at least one activated secondary connection, based on said transmission volume and said time.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

List of Acronyms and Abbreviations

3GPP $3^{rd}$ Generation Partnership Project
CA carrier aggregation
CC component carrier
CSI channel state information
DRX discontinuous reception
E-RAB evolved radio access bearer
E-UTRAN Evolved Universal Terrestrial Radio Access Network
eNB eNode, evolved Node B
HARQ hybrid automatic repeat request
ID identifier
IP internet protocol
LTE Long Term Evolution
LTE-A LTE-Advanced
MAC medium access control
MDT minimization of drive tests
NAS non-access stratum
non-GBR non guaranteed bit rate
OAM operation and maintenance
PDCCH physical downlink control channel
PDCP packet data configuration protocol
QCI QoS class identifier
QoS quality of service
RAN radio access network
RLC radio link control
RRC Radio Resource Control
SA service and system aspects
SDU service data unit
SI system information
TTI transmission time interval
UE User Equipment
WI work item

The invention claimed is:
1. A method, comprising
evaluating, at a network node and per communication endpoint at individual ones of user equipments, performance of carrier aggregation for the user equipments, the evaluating using throughput of individual ones of a primary connection and at least one activated secondary connection per communication endpoint aggregating one primary connection and at least one secondary connection, the evaluating comprising
determining, at the network node and per communication endpoint, a transmission volume, the transmission volume being a total transmission volume of both the primary connection and at least one activated secondary connection,
determining, at the network node and per communication endpoint, a time with transmission data in a transmission buffer for each of the primary connection and the at least one activated secondary connection,
determining, at the network node and per communication endpoint, a number of connections between the primary connection and at least one activated secondary connection for the determined time, and
obtaining, at the network node and per communication endpoint, a transmission throughput for each of the primary connection and the at least one activated secondary connection, based on said transmission volume, the number of connections, and said time with transmission data in the transmission buffer for each of the primary connection and the at least one activated secondary connection.

2. The method according to claim 1, wherein
said transmission volume is determined per radio access bearer both for the primary connection and per each number of activated secondary connections within a range from one to a predefined maximum number,
said time is determined per radio access bearer both for the primary connection and per said each number of activated secondary connections, and
said transmission throughput is obtained per radio access bearer both for the primary connection and per said each number of activated secondary connections.

3. The method according to claim 1, wherein, in relation to said obtaining, the method further comprises
dividing, per communication endpoint and per radio access bearer, said transmission volume by said time, both for the primary connection and per each number of activated secondary connections within a range from one to a predefined maximum number,
increasing respective volume counters based on a size of successfully transmitted medium access control serving data unit frames.

4. The method according to claim 1, wherein, in relation to said determining said transmission volume, said method further comprises
increasing respective volume counters based on a size of successfully transmitted packet data configuration protocol serving data unit frames,
delivering an inter-layer message indicating, per communication endpoint, activation or deactivation of a secondary connection, and
deducing, per communication endpoint and per radio access bearer, an actual number of activated secondary connections based on said inter-layer message.

5. The method according to claim 1, wherein, in relation to said determining said transmission volume, said method further comprises
modifying successfully transmitted medium access control service data unit frames by removing at least one of packet data configuration protocol headers, radio link control headers, medium access control headers, and hybrid automatic repeat request retransmissions, and
increasing respective volume counters based on a size of said modified frames, delivering an inter-layer message including at least information regarding current sizes of packet data configuration protocol headers and/or radio link control headers necessary for modification of medium access control service data unit frames.

6. The method according to claim 1, further comprising
accumulating, for a predetermined evaluation period, each of said transmission volumes per communication endpoint and per radio access bearer both for the primary connection and per each number of activated secondary connections within a range from one to a predefined maximum number,
accumulating, for a predetermined evaluation period, each of said times per communication endpoint, and
calculating, from said accumulated transmission volumes and said accumulated times, average and/or peak transmission throughput per communication endpoint and per radio access bearer.

7. The method according to claim 1, wherein
the method is operable at or by a base station or access node of a cellular system, and/or
the method is operable in at least one of a LTE and a LTE-A cellular system, and/or
a connection is a cell or established via a cell.

8. An apparatus, comprising
at least one memory comprising program code; and
at least one processor, the at least one memory and the program code configured, with the at least one processor, to cause the apparatus to:
evaluate, at a network node and per communication endpoint at individual ones of user equipments, performance of carrier aggregation for the user equipments, the evaluating using throughput of individual ones of a primary connection and at least one activated secondary connection per communication endpoint aggregating one primary connection and at least one secondary connection, the evaluating comprising
determine, at the network node and per communication endpoint, a transmission volume, the transmission volume being a total transmission volume of both the primary connection and at least one activated secondary connection,
determine, at the network node and per communication endpoint, a time with transmission data in a transmission buffer for each of the primary connection and the at least one activated secondary connection,
determine, at the network node and per communication endpoint, a number of connections between the primary connection and at least one activated secondary connection for the determined time, and
obtain, at the network node and per communication endpoint, a transmission throughput for each of the primary connection and the at least one activated secondary connection, based on said transmission volume, the number of connections, and said time with transmission data in the transmission buffer for each of the primary connection and the at least one activated secondary connection.

9. The apparatus according to claim 8, wherein
said transmission volume is determined per radio access bearer both for the primary connection and per each number of activated secondary connections within a range from one to a predefined maximum number,
said time is determined per radio access bearer both for the primary connection and per said each number of activated secondary connections, and
said transmission throughput is obtained per radio access bearer both for the primary connection and per said each number of activated secondary connections.

10. The apparatus according to claim 8, wherein the at least one memory and the program code are configured, with the at least one processor, to cause the apparatus to:
divide, per communication endpoint, endpoint and per radio access bearer, said transmission volume by said time both for the primary connection and per each number of activated secondary connections within a range from one to a predefined maximum number,
increase respective volume counters based on a size of successfully transmitted medium access control serving data unit frames.

11. The apparatus according to claim 8, wherein the at least one memory and the program code are configured, with the at least one processor, to cause the apparatus to:
increase respective volume counters based on a size of successfully transmitted packet data configuration protocol serving data unit frames.

12. The apparatus according to claim 11, wherein the at least one memory and the program code are configured, with the at least one processor, to cause the apparatus to:

deliver an inter-layer message indicating, per communication endpoint, activation or deactivation of a secondary connection, and deduce, per communication endpoint, an actual number of activated secondary connections based on said inter-layer message.

13. The apparatus according to claim 12, wherein said actual number is deduced per radio access bearer.

14. The apparatus according to claim 8, wherein the at least one memory and the program code are configured, with the at least one processor, to cause the apparatus to:

modify successfully transmitted medium access control service data unit frames by removing at least one of packet data configuration protocol headers, radio link control headers, medium access control headers, and hybrid automatic repeat request re-transmissions, and increase respective volume counters based on a size of said modified frames.

15. The apparatus according to claim 14, f wherein the at least one memory and the program code are configured, with the at least one processor, to cause the apparatus to:

deliver an inter-layer message including at least information regarding current sizes of packet data configuration protocol headers and/or radio link control headers necessary for modification of medium access control service data unit frames.

16. The apparatus according to claim 8, wherein the at least one memory and the program code are configured, with the at least one processor, to cause the apparatus to:

increase respective volume counters based on a size of successfully transmitted medium access control serving data unit frames.

17. The apparatus according to claim 8, wherein the at least one memory and the program code are configured, with the at least one processor, to cause the apparatus to:

accumulate, for a predetermined evaluation period, each of said transmission volumes per communication endpoint, endpoint and per radio access bearer both for the primary connection and per each number of activated secondary connections within a range from one to a predefined maximum number, accumulate, for a predetermined evaluation period, each of said times per communication endpoint and per radio access bearer both for the primary connection and per said each number of activated secondary connections, and calculate, from said accumulated transmission volumes and said accumulated times, average and/or peak transmission throughput per communication endpoint and per radio access bearer.

18. The apparatus according to claim 8, wherein the apparatus is operable as or at a base station or access node of a cellular system, and/or the apparatus is operable in at least one of a LTE and a LTE-A cellular system, and/or a connection is a cell or established via a cell.

19. A computer program product comprising a non-transitory computer-readable medium comprising computer-executable computer program code which, when the program is run on a computer, is configured to cause the computer to perform operations comprising:

evaluating, at a network node and per communication endpoint at individual ones of user equipments, performance of carrier aggregation for the user equipments, the evaluating using throughput of individual ones of a primary connection and at least one activated secondary connection per communication endpoint aggregating one primary connection and at least one secondary connection, the evaluating comprising determining, at the network node and per communication endpoint, a transmission volume, the transmission volume being a total transmission volume of both the primary connection and at least one activated secondary connection, determining, at the network node and per communication endpoint, a time with transmission data in a transmission buffer and for each of the primary connection and the at least one activated secondary connection, and obtaining, at the network node and per communication endpoint, a transmission throughput for each of the primary connection and the at least one activated secondary connection, based on said transmission volume, the number of connections, and said time with transmission data in the transmission buffer for each of the primary connection and the at least one activated secondary connection.

* * * * *

UNITED STATES PATENT AND TRADEMARK OFFICE
CERTIFICATE OF CORRECTION

PATENT NO. : 9,967,763 B2
APPLICATION NO. : 14/773468
DATED : May 8, 2018
INVENTOR(S) : Kollar et al.

Page 1 of 1

It is certified that error appears in the above-identified patent and that said Letters Patent is hereby corrected as shown below:

In the Claims

Claim 15, Column 19, Line 19 "f" should be deleted in between --claim 14,-- and --wherein--.

Signed and Sealed this
Twenty-fourth Day of July, 2018

Andrei Iancu
*Director of the United States Patent and Trademark Office*